US011975428B2

(12) United States Patent
Ellerbrock

(10) Patent No.: US 11,975,428 B2
(45) Date of Patent: May 7, 2024

(54) ASSEMBLY TOOL

(71) Applicant: WHIRLPOOL CORPORATION, Benton Harbor, MI (US)

(72) Inventor: Nathan L. Ellerbrock, Ottawa, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 386 days.

(21) Appl. No.: 17/409,868

(22) Filed: Aug. 24, 2021

(65) Prior Publication Data

US 2023/0060327 A1 Mar. 2, 2023

(51) Int. Cl.
*B25B 27/02* (2006.01)
*F25D 21/14* (2006.01)

(52) U.S. Cl.
CPC .............. *B25B 27/02* (2013.01); *F25D 21/14* (2013.01); *F25D 2321/146* (2013.01)

(58) Field of Classification Search
CPC .......................... B25B 27/02; F25D 2321/146
See application file for complete search history.

(56) References Cited

U.S. PATENT DOCUMENTS 3,336,652 A 8/1967 Ullmo
3,990,139 A 11/1976 Touchet
4,635,638 A * 1/1987 Weintraub .......... A61B 17/062 606/147
8,534,676 B2 * 9/2013 Whisenand ............ B60R 25/00 279/142
9,517,552 B2 12/2016 Tomuro et al.

FOREIGN PATENT DOCUMENTS

DE 2613240 A1 10/1977

* cited by examiner

*Primary Examiner* — Lionel Nouketcha
(74) *Attorney, Agent, or Firm* — Brooks Kushman P.C.

(57) ABSTRACT

A tool configured to assemble a drain to a household appliance wall, the drain formed by an interior tube and an exterior tube, the tool including a jaw, a housing, a spring and a guide member. The jaw is formed by a pair of arms and configured to move between a closed position, in which the jaw is configured to be inserted through an aperture formed by the household appliance wall, and an open position in which the jaw is configured to engage the interior tube. The housing houses the jaw and the spring is fixed to the housing and configured to bias the jaw towards the closed position. And the pair of arms are configured to move from the closed position to the open position as the jaw is inserted through the aperture.

20 Claims, 5 Drawing Sheets

ASSEMBLY TOOL

TECHNICAL FIELD

The present disclosure relates to tools or other devices used to assemble or fix components to one another.

BACKGROUND

Appliances, specifically appliances that consume or expel water or other fluids generally include a drain that may be formed by a one or more tubes or conduit that may be assembled to one another and fixed to a wall of the appliance.

SUMMARY

According to one embodiment, a tool configured to assemble a first component to a second component is provided. The first component and the second component may each be disposed within an appliance. The tool may include a jaw that may be formed by a pair of arms that may each be configured to move between a closed position, in which the jaw is configured to be inserted through an aperture formed by a wall of the appliance, the first component, and the second component, and an open position, in which the jaw is configured to engage the first component. The tool may also include a pneumatic device that may be provided with a translatable member configured to actuate to: (a) move the pair of arms from the closed position to the open position, and (b) move the jaw and the first component towards the wall of the appliance so that the first component is fixed to the second component, and (c) return to start, moving the jaw away from the wall of the appliance and returning the pair of arms to the closed position.

According to another embodiment, a method of assembling a through-wall component including a first element and a second element configured to be fixed to the first element is provided. The method may include providing a tool including a jaw and an air cylinder. The jaw may be formed by a pair of arms that may be configured to move between a closed position and an open position. The air cylinder may include a translatable member that may be configured to actuate to move the jaw from the closed position to the open position. As an example, actuating the air cylinder may translate the tool so that portions of the arms contact the first or second elements to move the jaw to the open position. The method may also include inserting the tool, in the closed position, through an aperture formed by a wall of a number of walls of the compartment, moving the jaw from the closed position to the open position, and actuating the air cylinder to retract the jaw so that the jaw contacts and moves the first element towards the second element to fix the first element to the second element.

According to yet another embodiment, a tool configured to assemble a drain to a household appliance wall is provided. The drain may include an interior tube and an exterior tube. The tool may include a jaw, a housing, and a spring. The jaw may be formed by a pair of arms and configured to move between a closed position, in which the jaw is configured to be inserted through an aperture formed by the household appliance wall, and an open position in which the jaw is configured to engage the interior tube. The housing may house the jaw and the spring may be fixed to the housing and configured to bias the jaw towards the closed position. The pair of arms may be configured to move from the closed position to the open position as the jaw is inserted through the aperture.

DETAILED DESCRIPTION

Figure 1A:
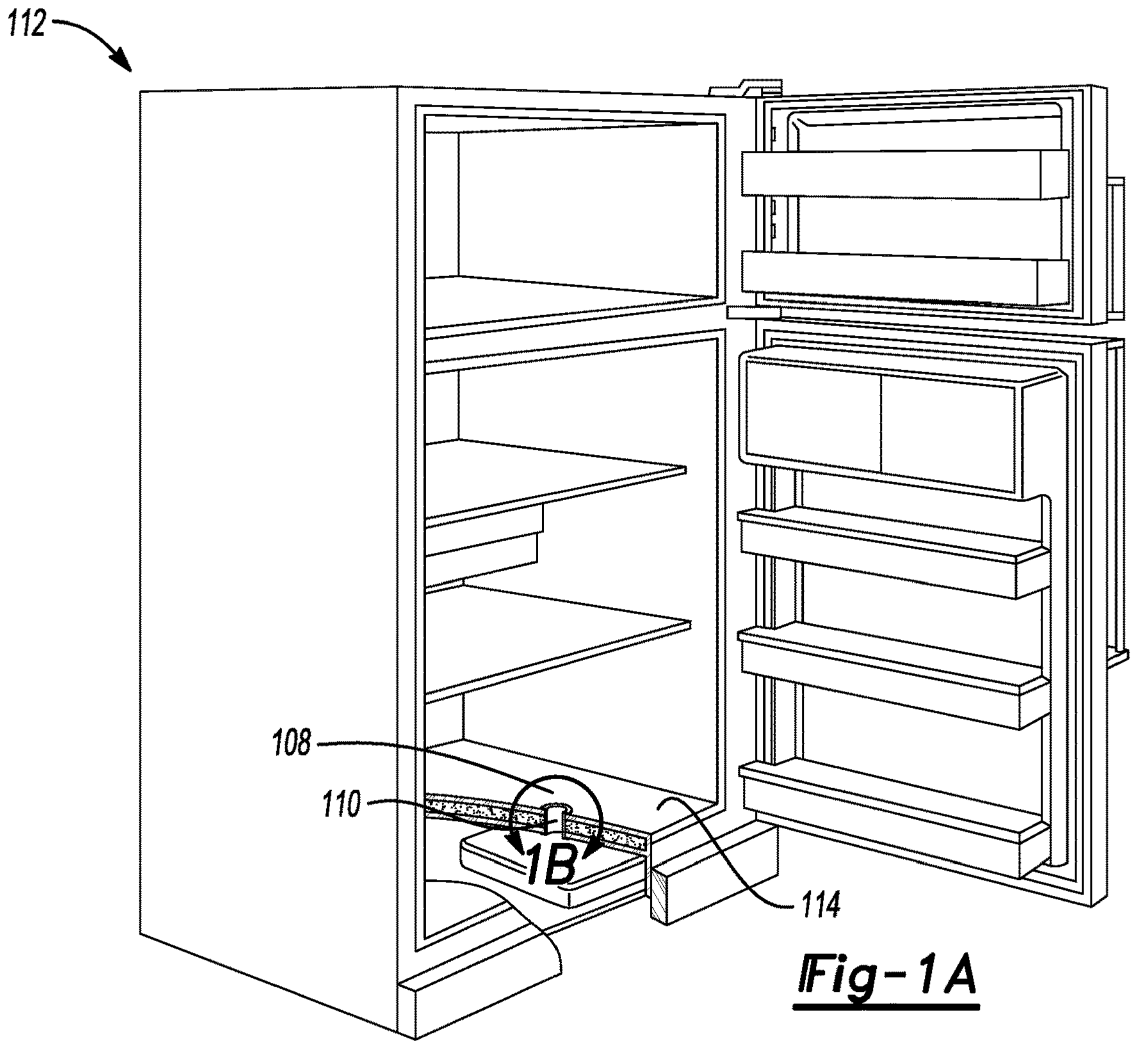
FIG. 1A is perspective view of an exemplary household appliance.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form “a,” “an,” and “the” comprise plural referents unless the context clearly indicates otherwise. For example, reference to a component in the singular is intended to comprise a plurality of components.

The term “substantially” or “about” may be used herein to describe disclosed or claimed embodiments. The term “substantially” or “about” may modify a value or relative characteristic disclosed or claimed in the present disclosure. In such instances, “substantially” or “about” may signify that the value or relative characteristic it modifies is within ±0%, 0.1%, 0.5%, 1%, 2%, 3%, 4%, 5% or 10% of the value or relative characteristic.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Known methods of assembling the drain assembly include inserting one portion of the drain assembly into an aperture formed by a wall of an appliance and positioning or partially inserting the other portion of the drain assembly into the portion disposed in the aperture. A tool such as a slide hammer may then be inserted through the drain assembly and manually actuated to move one portion of the drain assembly towards the other portion to assemble the drain assembly. This method of assembly may be cumbersome and labor intensive. Moreover, the force applied by the slide hammer may vary with each strike and this variance may lead to incorrect assembly of the drain assembly to the appliance wall. The present disclosure aims to resolve at least one or more of the above-mentioned problems.

FIG. 1A illustrates a partial-perspective view of an exemplary household appliance such as a refrigeration appliance or refrigerator 112 that includes a refrigerator compartment and a freezer compartment. The refrigerator may include a number of walls including a bottom wall 114 that may include an aperture 108 and a drain assembly 110 may be disposed in the aperture 108. The drain assembly 110 may be configured to route fluid such as condensate from the refrigerator compartment, the freezer compartment or both to a drip pan disposed below the bottom wall 114.

Figure 1B:
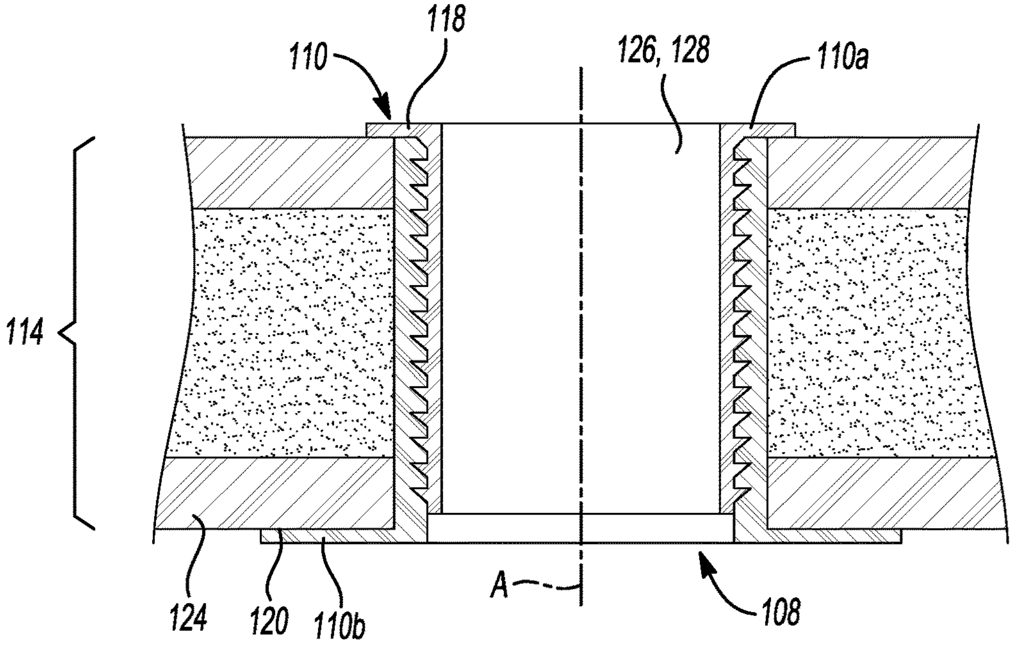
FIG. 1B is a cross-sectional view of a portion of the exemplary household appliance shown in FIG. 1A.

FIG. 1B illustrates a detail-cross-sectional view taken along the lines B-B in FIG. 1A. The drain assembly 110 may include an interior tube 110*a* and an exterior tube 110*b* that may receive the interior tube 110*a* to form a watertight connection between the interior tube 110*a* and the exterior tube 110*b*. Each of the tubes 110*a*, 110*b* may include a flange 118, 120. When the drain assembly 110 is assembled to the bottom wall 114, the flange 118 of the interior tube 110*a* may lie along an interior surface 122 of the bottom wall 114 and the flange 120 of the exterior tube 110*b* may lie along an exterior surface 124 of the bottom wall 114. As will be described in greater detail below, the drain assembly 110 may be fixed to the housing by use of a tool. Prior to fixing the drain assembly 110 to the bottom wall 114, the drain assembly 110 may be pre-assembled in a partially assembled stated. As an example, pre-assembling the drain assembly 110 may include inserting the exterior tube 110*b* into the aperture 108 and partially inserting the interior tube 110*a* into a hollow space 126 of the exterior tube 110*b*.

Figure 2:
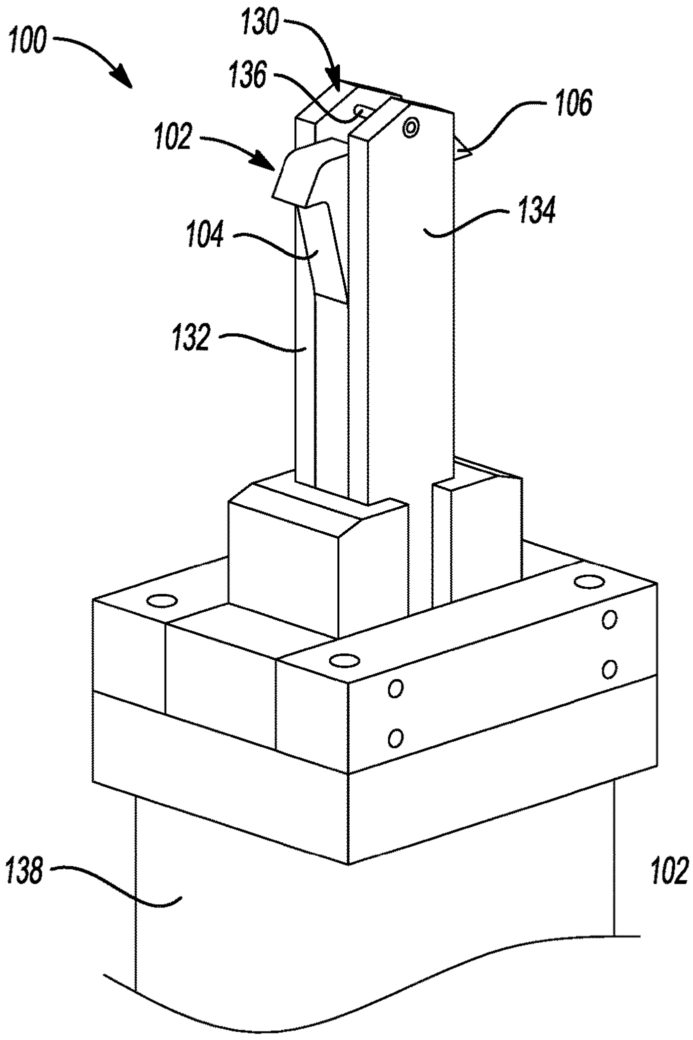
FIG. 2 is a perspective view of an exemplary assembly tool.

Referring to FIG. 2, a tool 100 configured to assemble a through-wall component or assembly such as the drain 110 is provided. The tool 100 may include a jaw 102 that may be formed by a first arm 104 and a second arm 106 that are each configured to move e.g., pivot or rotate between a closed position and an open position. When the jaw 102 is in the closed position, the jaw 102 may be inserted through the aperture 108 and the hollow space 126 of the exterior tube 110*b* (FIG. 1B) and a hollow space 128 of the interior tube 110*a*.

The tool 100 may include a housing 130 and the jaw 102 may be disposed in the housing 130. As an example, the housing 130 may include a main body that may be formed by a first planar member 132 and a second planar member 134 that may collectively sandwich the first arm 104 and the second arm 106. The first and second planar members 132, 134 may be spaced apart by a spacer 136 so that the first and second arms 104, 106 have sufficient clearance between the planar members 132, 134 to rotate between the open position and the closed position. The tool 100 may be coupled to a linear actuator such as a pneumatic device including but not limited to an air cylinder 138. The air cylinder 138 may be configured to translate the tool into and out of the aperture 108 and the interior and exterior tubes 110*a*, 110*b* along an axis A.

Figure 3:
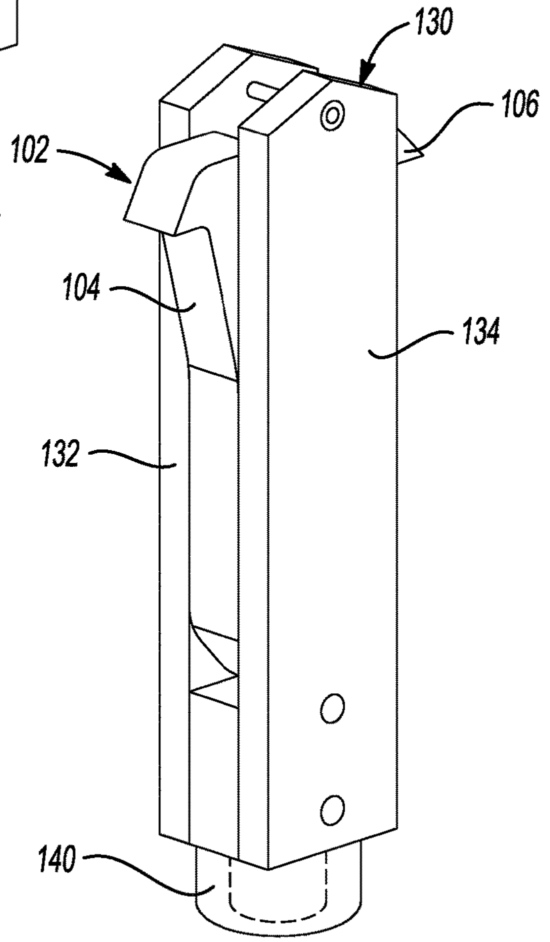
FIG. 3 is a partial-perspective view of the exemplary assembly tool shown in FIG. 2.

Referring to FIG. 3, a partial-perspective view of the tool 100 according to one or more embodiments, is provided. The tool 100 may include a coupling member 140 that may couple the tool 100 to the air cylinder 138. As an example, the air cylinder 138 may include a threaded rod (not illustrated) that may engage the coupling member 140 so that the tool is fixed to the air cylinder 138.

Figure 4:
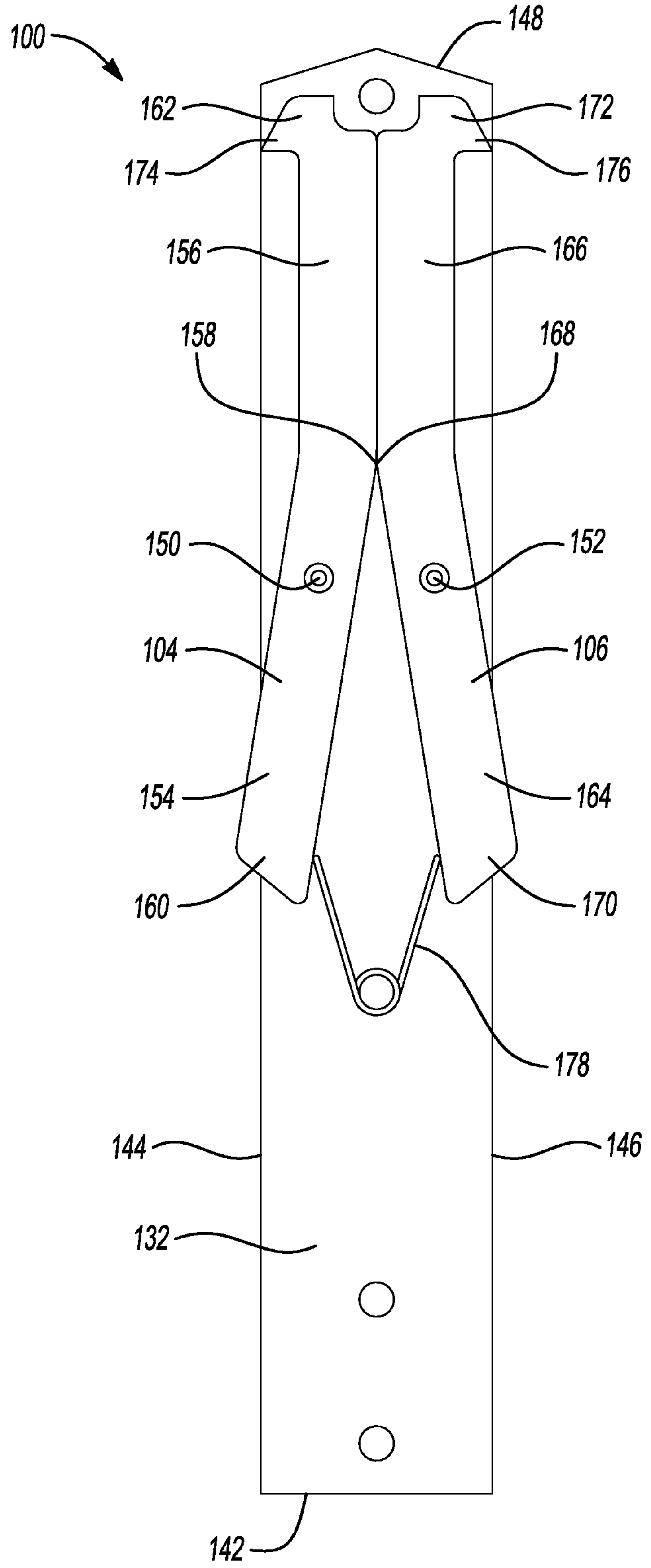
FIG. 4 is a plan view of a portion of the exemplary assembly tool.

Referring to FIG. 4, a plan view of the tool 100 provided with the jaw 102 in the closed position is illustrated. For the purposes of clarity, the second planar member 134 is not illustrated. However, the description of the first planar member 132 provided herein is equally applicable to the second planar member 134. The first planar member 132 may have an elongated rectangular shape, in other words, a length of the member 132 is longer than the width. The planar member 132 may include a bottom edge 142 that may extend between a first lateral edge 144 and a second lateral edge 146. A top edge 148, opposite the bottom edge 142, may have a tapered point that may facilitate insertion of the tool 100 into the drain 110, the aperture 108, or both.

A number of protrusions or posts such as a first post 150 and a second post 152 may extend from the first planar member 132 and the first and second arms 104, 106 may be pivotally attached to the first post 150 and the second post 152, respectively. The first arm 104 may include a first bottom portion 154 and a first top portion 156 that may converge at a corner 158. The first bottom portion 154 may include a first bottom distal end portion 160 and the first top portion 156 may include a first top distal end 162. The first bottom portion 154 may include a first bottom distal end portion 160 and the first top portion 156 may include a first top distal end 162.

The second arm 106 may include a second bottom portion 164 and a second top portion 166 that may converge at a corner 168. As illustrated, when the jaw 102 is in the closed position, the corner 158 of the first arm 104 and the corner 168 of the second arm 106 may contact one another. The second bottom portion 164 may include a second bottom distal end portion 170 and the second top portion 166 may include a second top distal end 172. The first top distal end 162 may include a first barb 174 and the second top distal end 172 may include a second barb 176. As will be described in greater detail below, when the jaw 102 is in the open position, the first barb 174 and the second barb 176 may each be configured to engage, such as contact, the flange 118 of the interior tube 110*a* and apply a force to the flange 118 to displace the interior tube 110*a* into the exterior tube 110*b*, the aperture 108, or both.

A biasing member, such as a spring 178, may bias the arms 104, 106 to the closed position. As an example, the spring 178 may be a coil spring provided with a first arm 182 and a second arm 184 that may each be positioned to engage the first bottom distal end portion 160 and the second bottom distal end portion 170, respectively. The spring 178 may be fixed to the first planar member 132 by a third post 180 that may be disposed between the first and second arms 104, 106. When the jaw 102 is in the closed position, the first bottom distal end portion 160 and the second bottom distal end portion 170 may each extend past the first lateral edge 144 and the second lateral edge 146, respectively. The bottom distal end portions 160, 170 may extend beyond the lateral edges 144, 146 so that as the tool 100 is inserted into the exterior tube 110*b*, the interior tube 110*a*, or the aperture 108, the bottom distal end portions 160, 170 may contact an inner periphery, such as the inner periphery 192 of a guide member 188 (FIG. 5A) to squeeze or deflect the bottom distal end portions 160, 170 towards one another to rotate the arms 104, 106 so that the first top distal end 162 and the second top distal end 172 move away from each other to open the jaw 102.

Figure 5A:
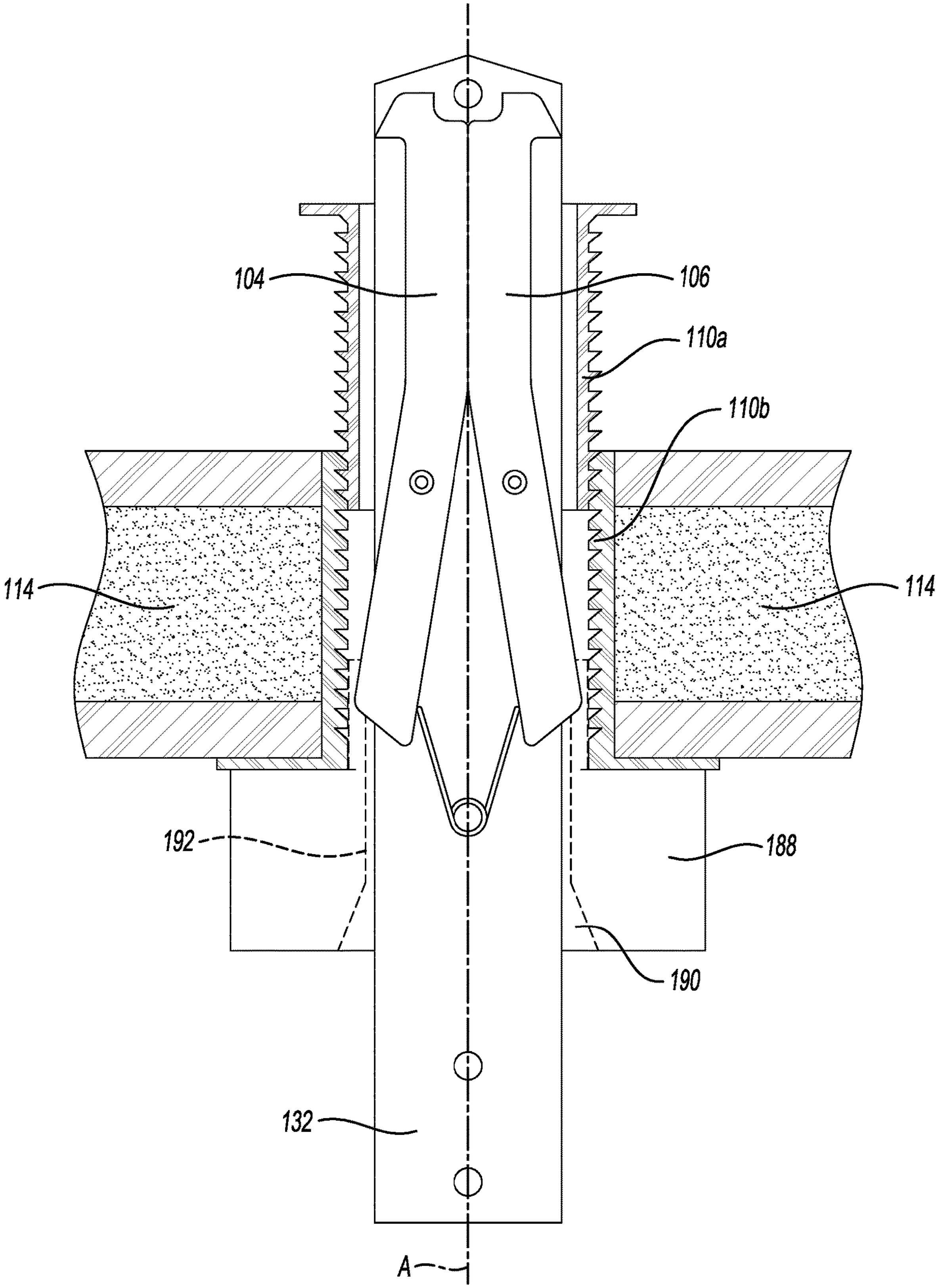
FIG. 5A is a plan view of a portion of the exemplary assembly tool and drain in an uninstalled position.
Figure 5B:
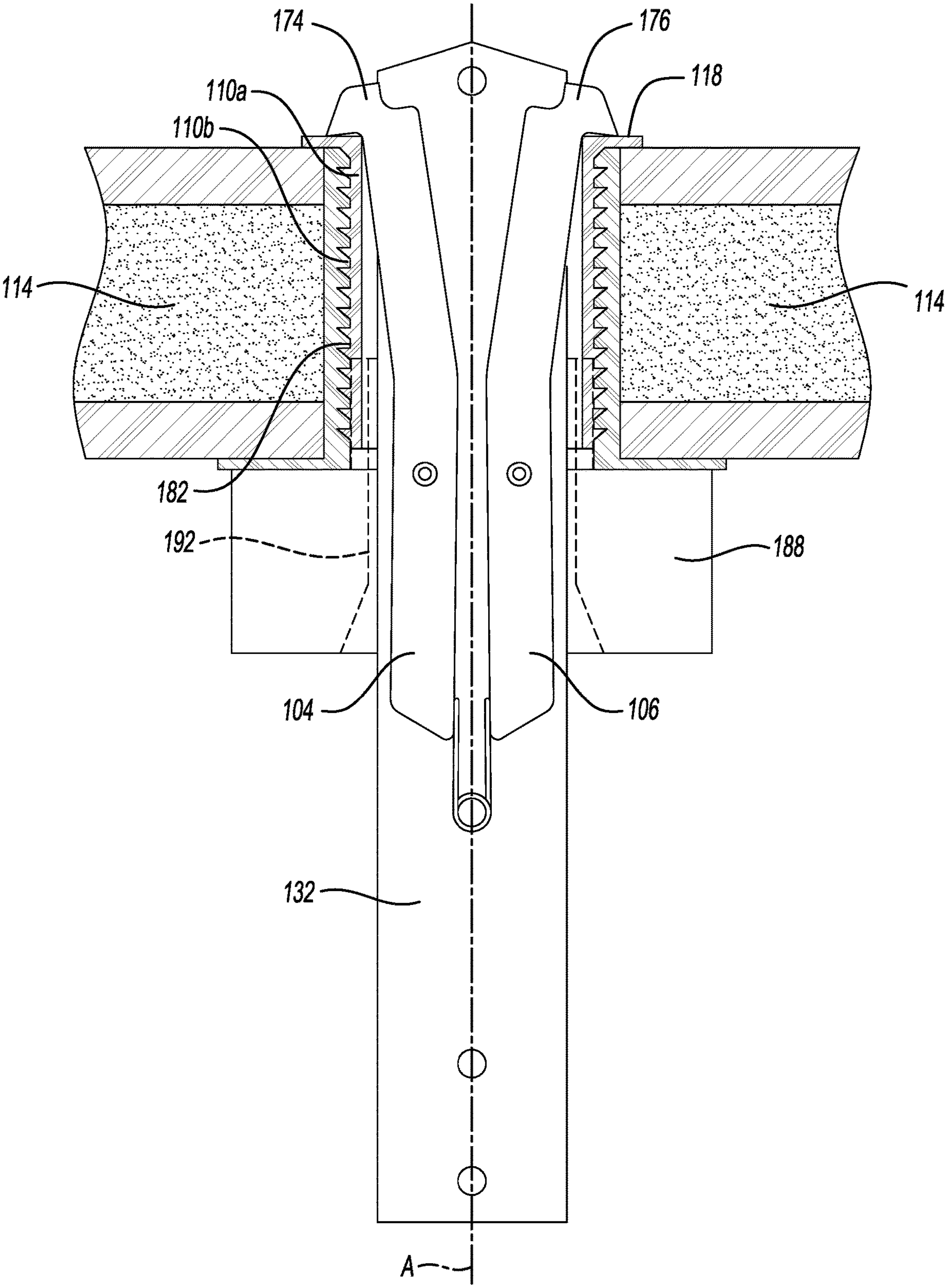
FIG. 5B is a plan view of a portion of the exemplary assembly tool and drain in an installed position.

Referring to FIG. 5A, the drain assembly 110 in the pre-assembled state and the tool 110 disposed in the pre-assembled drain assembly 110 is illustrated. The tool 100 may be inserted through the exterior tube 110*b* and the interior tube 110*a* so that the first top distal end 162 and the second top distal end 172 extend beyond the flange 118 of the interior tube 110*a*. The inner periphery 182 of the exterior tube 110*b* or the inner periphery 192 of the guide member 188 may engage and squeeze the bottom distal end portions 160, 170 towards one another to move the jaw 102 to the open position. Once the jaw is opened the air cylinder 138 may be actuated so that the barbs 174, 176 move towards and engage the first flange 118 to displace the interior tube 110*a* so that the interior tube 110*a* is seated within the exterior tube 110*b* (FIG. 5B). Once the interior tube 110*a* is seated in the exterior tube 110*b* and the drain assembly 110 is in the installed state, the bottom distal end portions 160, 170 disengage from the inner periphery 182 of the exterior tube 110*b* or the inner periphery 192 of the guide member 188 so that the spring 178 may bias the bottom distal end portions 160, 170 away from one another so that the jaw 102 moves the closed position. Once the jaw 102 is in the closed position and the drain assembly 110 is in the assembled state, the air cylinder 138 may be actuated to retract the tool 110 from the drain assembly 110.

In one or more embodiments, the tool 100 may include the guide member 188 that may be fixed with respect to the planar member 132 and the jaw 102. The guide member 188 may define a guide channel 190 that may be arranged to guide the planar member into the interior and exterior tubes 110*a*, 110*b*. The guide channel 190 may be formed by one or more inner walls 192. The inner walls 192 may be configured to engage the arms 104, 106 as the jaw 102 is retracted to move the interior tube 110*a* (FIG. 5A) to the installed position (FIG. 5B).

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A tool configured to assemble a first component to a second component, wherein the first component and the second component are each disposed within an appliance, the tool comprising:

a jaw formed by a pair of arms configured to move between a closed position, in which the jaw is configured to be inserted through an aperture formed by a wall of the appliance, the first component and the second component, and an open position, in which the jaw is configured to engage the first component; and a pneumatic device including a translatable member configured to actuate to: (a) move the jaw into the aperture, (b) move the pair of arms from the closed position to the open position, and (c) move the jaw and the first component towards the wall of the appliance so that the first component is fixed to the second component.

2. The tool of claim 1, further comprising:

a main body, wherein the jaw is pivotally attached to the main body and the pneumatic device is configured to translate the main body and the jaw.

3. The tool of claim 2, wherein the translatable member includes a piston and a rod coupled thereto and the rod is detachably connected to the main body.

4. The tool of claim 2, wherein the main body is formed by a number of planar rectangular members.

5. The tool of claim 4, wherein the number of planar rectangular members includes a first planar rectangular member and a second planar rectangular members sandwiching the pair of arms.

6. The tool of claim 4, wherein a first planar rectangular member of the number of planar rectangular members includes a first lateral edge, a second lateral edge, and a bottom edge extending therebetween, wherein the pair of arms include a first end and a second end, the second end disposed closer to the bottom edge than the first end, and when the jaw is in the closed position, portions of the second end of a first arm of the pair arms extends past the first lateral edge.

7. The tool of claim 6, further comprising:
a guide member fixed with respect to the translatable member, wherein the second end of the first arm is configured to contact an inner periphery of the guide member to deflect the second end of the first arm and move the first end of the first arm to the open position.

8. The tool of claim 6, wherein the first planar rectangular member includes a top edge and the top edge is tapered with respect to the first and second lateral edges.

9. The tool of claim 6, a pair of posts extending from first planar rectangular member, wherein a first arm and a second arm of the pair of arms are each pivotally connected to a first post and a second post of the pair of posts, respectively.

10. A method of assembling a through-wall component including a first element and a second element configured to be fixed to the first element, the method comprising:
providing a tool including,
a jaw formed by a pair of arms configured to move between a closed position and an open position, and
an air cylinder including a translatable member configured to actuate to move the jaw from the closed position to the open position;
inserting the tool, in the closed position, through an aperture formed by a first wall of a number of walls of the compartment; and
actuating the air cylinder to move the jaw from the closed position to the open position and retract the jaw so that the jaw contacts and moves the first element towards to the second element to fix the first element to the second element.

11. The method of claim 10, wherein each of the arms include a barbed portion and the actuating step includes the barbed portions contacting a portion of the first element.

12. The method of claim 10, further comprising:
inserting the second element into the aperture from a first direction; and
inserting, in a second direction opposite the first direction, at least a portion of the first element into a hollow space of the second element.

13. The method of claim 12, wherein the moving step includes an inner periphery of the second element contacting and squeezing distal ends of the pair of arms towards one another.

14. The method of claim 10, wherein the first element includes a first flange and the actuating step includes moving the first element so that the first flange contacts the first wall.

15. The method of claim 10, further comprising:
moving the jaw from the open position to the closed position by retracting the jaw so that distal ends of each of the arms of the pair of arms are disposed above a guide member configured to squeeze distal ends of the pair of arms towards one another.

16. A tool configured to assemble a first component to a second component, wherein the first component and the second component are each disposed within an appliance, the tool comprising:
a jaw formed by a pair of arms configured to move between a closed position, in which the jaw is configured to be inserted through an aperture formed by a wall of the appliance, the first component and the second component, and an open position, in which the jaw is configured to engage the first component; and
an actuator including a translatable member configured to actuate to: (a) move the jaw into the aperture, (b) move the pair of arms from the closed position to the open position, and (c) move the jaw and the first component towards the wall of the appliance so that the first component is fixed to the second component.

17. The tool of claim 16, wherein the actuator is a pneumatic cylinder.

18. The tool of claim 17, wherein the main body is formed by a number of planar members.

19. The tool of claim 16 further comprising a spring arranged to bias the pair of arms towards the closed position.

20. The tool of claim 16 further comprising:
a main body, wherein the pair of arms is pivotally attached to the main body and the actuator is configured to translate the main body and the jaw.

* * * * *